3,461,113
PROCESS FOR RECOVERING FLAVIN-ADENINE DINUCLEOTIDE
Masao Tanaka, Machida-shi, Nobuo Nakamura, Itabashi-ku, and Seigo Takasawa, Machida-shi, Tokyo-to, Japan, assignors to Kyowa Hakko Kogyo Company Limited (Kyowa Hakko Kogyo Kabushiki Kaisha), Tokyo-to, Japan, a body corporate of Japan
No Drawing. Filed Oct. 27, 1966, Ser. No. 589,790
Claims priority, application Japan, Dec. 23, 1965, 40/78,888
Int. Cl. C07d 51/50, 51/52
U.S. Cl. 260—211.3         15 Claims

ABSTRACT OF THE DISCLOSURE

A process of recovering flavin-adenine dinucleotide from crude aqueous solutions by means of phenolic cation exchange resins.

---

This invention relates to a process for recovering flavin-adenine dinucleotide (hereinafter designated FAD) in purified form from an aqueous solution thereof, particularly such aqueous solutions which in addition to FAD contain impurities such as proteins, amino acids, nucleic acid derivatives and mixtures thereof.

FAD is present in many substances which are important in various enzymatic reactions in living bodies, and represents one of the biologically active forms of vitamin $B_2$ (riboflavin). FAD has thus been used as a substitute for riboflavin both as a medicament and as an additive to food and feed-stuffs.

As is well known, FAD is formed in an aqueous solution such as cell extract, fermentation broths, filtrates, etc., which contain in addition to the FAD various other impurities such as proteins, amino acids, and/or nucleic acid derivatives. The major difficulty in obtaining FAD has, in the past, been due to the difficulty of removing FAD from this crude aqueous solution so that a pure FAD product can be obtained.

In the past, FAD has been recovered from these crude aqueous solutions in pure form by utilizing anion exchange resins. This method of recovering FAD is very disadvantageous due to the poor yields, operating dangers, and low purity of the FAD obtained. Furthermore, by use of this method, it is extremely difficult to separate impurities such as nucleic acids, from the recovered FAD. Additionally there are dangers in this method due to the possible contamination of FAD with large amounts of inorganic salts and the decomposition of the FAD.

Methods of purifying FAD by means of a cation exchange resin have not previously been proposed, with the exception of one method which uses a weak acidic ion exchange resin of the carboxylic acid type ("Biochimica et Biophysica Acta" 16 424 (1955)). This method however is not suitable for operation on an industrial scale since only small amounts of the crude solution containing FAD can be treated at any one time. An improved method of recovering pure FAD using an absorbent such as activated carbon and acidic terra alba is disclosed in Japanese Patent Publication No. 13944/1964, but such absorbents as activated carbon and terra alba are not suitable for industrial use because these materials cannot, in general, be treated on a large scale and moreover these materials present various other problems when used industrially.

It is an object of the present invention to provide an improved process for recovering FAD in purified form from crude aqueous solutions containing FAD utilizing a cation exchange resin, said process being particularly applicable for recovering pure FAD from crude aqueous solutions, such as cell extracts, fermentation broths, filtrates, etc. It is another object of the present invention to provide a process for recovering FAD in purified form which is suitable for industrial application and is more economical than previously known processes.

According to the present invention, a process is provided for recovering FAD in pure form from crude aqueous solutions containing crude FAD as well as organic impurities such as proteins, amino acids, nucleic acid derivatives, etc., and mixtures thereof by first adjusting the pH of the crude solutions to a pH of from about 1.0 to 3.0, thereafter passing the crude solution at this pH into a phenolic cation exchange resin, to absorb the FAD on the resin and thereafter eluating the FAD from the resin by passing an aqueous eluant or medium having a pH of from about 3.0 to about 10 through said resin. The FAD can be recovered in its pure form from the aqueous medium into which it was eluated by any of the conventional methods such as evaporation, precipitation, etc. Therefore, by means of this process FAD can be easily and economically recovered in pure form from its crude aqueous solutions containing various impurities. Furthermore, by means of this method pure FAD is obtained in high yields without the danger of its decomposition. Hence this process of this invention provides an easy and economic means for recovering FAD from cell extracts, fermentation broths, filtrates, etc.

The FAD is absorbed from the crude aqueous solution by the cation exchange resin while it is maintained at a pH of from 1.0 to 3.0. The cation exchange resin is then preferably washed with an aqueous acidic solution or an acidic salt solution until no substantial coloring (or significant UV absorption) can be observed in the washings. An aqueous solution containing hydrochloric acid, sodium chloride and mixtures thereof is particularly preferred for this purpose.

The FAD can then be eluated from the resin with an aqueous eluant having a pH of about 3.0–10.0 to yield an aqueous solution containing purified FAD. The aqueous medium used for elution may if desired contain an organic solvent.

Any conventional phenolic cation exchange resin can be utilized in accordance with this invention to absorb the FAD from its crude solution without absorbing the various impurities that are present in this crude solution. Preferred phenolic cation exchange resins for use in the process according to the present invention include, for example, phenolic cation exchange resins having radicals such as sulphonic acid radicals, methyl-sulphonic acid radicals or mixtures of these radicals (e.g., "Duolite" C-3, "Duolite" C-1, "Duolite" C-10 the trade names of phenolic catio nexchange resins available from Chemical Process Co., U.S.A.—or "Dowex" 30—the trade name of a phenolic cation exchange resin available from Dow Chemical Co., U.S.A.).

After eluting the FAD the phenolic cation exchange resin can be regenerated with an acidic or alkaline aqueous solution to convert the resin thereby regenerating the resin to its free base form or to its sodium or ammonium salt form. The cation exchange resins after being regenerated are suitable for absorbing FAD from aqueous solutions. While the phenolic cation exchange resins can absorb the FAD in both its free base forms and in its salt forms, it is preferable to use the phenolic cation exchange resin in its salt form particularly in the sodium or ammonium salt form to prevent any decomposition of the FAD and obtain higher yields. Although the FAD-containing solution can be treated by any of the conventional purification techniques utilizing exchange resins, in accordance with this invention, it is advantageous to pack the resin in columns, through which the crude FAD-containing solution can be passed. In this manner better results can generally be achieved in the absorbing, eluting and regenerating steps.

Before passing the crude FAD-containing aqueous solution through the resin column the pH of the crude solution should be adjusted to about 1.0–3.0. This pH range is important since a higher pH is disadvantageous for preventing leakage of FAD from the column, while a lower pH must be avoided to maintain the stability of FAD obtained. Also the FAD will not be sufficiently absorbed by the phenolic cation exchange resin, if the pH of the crude solution which is passed through the column is higher than about 3.0. Therefore, the FAD-containing solution contacted with the phenolic cation exchange resin must have a pH ranging from about 1.0 to 3.0, preferably this pH should be from about 1.0 to 2.5. The presence of certain amounts of cation in the FAD-containing solution has been found to facilitate the separation of FAD from other impurities such as nucleic acid derivatives. For this reason, an inorganic salt such as for example sodium chloride, ammonium chloride or mixtures thereof is preferably dissolved in the crude FAD-containing aqueous solution prior to contact with the phenolic cation exchange resin. These salts may, for example, be introduced into the crude aqueous solution in a concentration of about 1 mol per litre.

Among eluants suitable for use in the process according to the present invention, water gives particularly good results since the resulting FAD-containing solution will then contain little or no inorganic salts so that the purified FAD can be obtained from the aqueous solution by the concentration of the solution or by the addition of a suitable solvent thereto.

Deionized water can be used with particular advantage for the elution of FAD. Also a slightly alkaline aqueous solution can, if desired, be used as an eluant. However, when the pH of the eluant is too high (i.e. above 10), impurities, particularly coloring substances, may also be eluted from the phenolic cation exchange resin thus reducing the purity of the FAD obtained and possibly also decomposing the FAD. It is preferred therefore to use deionized water or water having a pH adjusted to a value of from about 3.0 to about 10.0. The pH can for example be adjusted within this range by addition of a suitable acid or mixtures of acids (e.g. hydrochloric acid or acetic acid). Aqueous buffer solutions having a suitable pH can also be employed for the elution of the absorbed FAD.

It can also be convenient to use an aqueous mixture containing water and a water-miscible organic liquid solvent e.g., methanol, ethanol, acetone, pyridine or mixtures that elute the absorbed FAD from the resin. This aqueous mixture should, in accordance with this invention, have a pH of from about 3.0 to about 10. By use of these aqueous liquid mixtures containing these organic solvents, solutions of highly purified FAD can be obtained by an analogous method to that described above using water.

The FAD can be recovered from the eluate obtained by utilizing water solutions, water or still organic solvent mixtures by any of the conventional methods of recovery. A typical method which may be utilized to recover the FAD is carried out by first concentrating the eluate under reduced pressure at low temperatures. After concentration the FAD may be easily precipitated therefrom by adding a suitable organic solvent such as ethanol to the concentrate.

The purity of the FAD obtained by the process of the invention depends upon the amounts of the impurities in the starting material. However, yields of FAD having a purity of more than about 80–90% are commonly obtained by means of the method of this invention. More highly purified FAD can be prepared by simply repeating the process according to the invention.

For the better understanding of the invention the following examples are given by way of illustration only.

Example 1

50 ml. of "Duolite" C–10 (the trade name of a phenolic cation exchange resin available from Chemical Process Co., U.S.A.) were regenerated to its free base form and packed in a resin column. One fourth mol of sodium chloride was added to 250 ml. of a crude aqueous solution from a cell extract, said solution containing 20.1 mg. of FAD. This solution was then adjusted to a pH of 2.5 and passed through the resin column. The ratio of the optical absorbances at 450 m$\mu$ and 260 m$\mu$ of this crude FAD-containing solution prior to passing it through the column was 32.4 as compared with the corresponding value of 3.28 for a pure FAD solution. This indicated that the crude solution which was to be passed through the resin column contained substantial impurities. The FAD from the crude solution was absorbed by the cation exchange resin, while the impurities such as nucleic acid derivatives, sugars and coloring materials passed through with the solution without being absorbed by the resin. After the crude solution was passed through the resin bed, the resin bed was washed with 1 liter of 0.02 N hydrochloric acid solution containing 1 mol of sodium chloride. After washing, the FAD was then eluted from the resin bed by passing deionized water into the bed. 210 ml. of the eluate containing 18.5 mg. of FAD was obtained. The absorbance ratio of this eluate was 3.31 at 450 m$\mu$ and 260 m$\mu$. This indicated that the eluate did not contain any substantial amount of impurities. This eluate was then concentrated at temperatures below 40° C. and under reduced pressure. After concentration ethanol was then added to the concentrated eluate in an amount of about 9 times by volume. Thereafter the solution was cooled to yield a precipitate. This precipitate was separated from the solution dried in a conventional manner to yield 14.7 mg. of FAD having a purity of 87.2%.

Example 2

A fermentation broth was treated with a strongly basic anion exchange resin to yield aqueous liquor, 500 ml. of which contained 51.3 mg. of FAD. This aqueous liquor had an absorbance ratio of 43.2 at 450 m$\mu$ and 260 m$\mu$ which indicated the presence of substantial impurities. The pH of this liquor was adjusted to 2.0, and the liquor was passed through a resin column packed with 100 ml. of "Duolite" C–10 (the trade name of a phenolic cation exchange resin available from Chemical Process Co., U.S.A.) to absorb FAD. This cation exchange resin had previously been washed with a sodium hydroxide solution to regenerate the resin into its sodium form and thereafter washed with water. After absorption of FAD, the resin was washed with 2 litres of 0.02 N hydrochloric acid containing 0.5 mol per litre of sodium chloride. After washing the FAD was eluted from the resin by passing water containing a small amount of hydrochloric acid and having a pH of 3.5 therethrough. The recovered eluate was an FAD containing the solution which had an absorbance ratio of 3.56 at 450 m$\mu$ and 260 m$\mu$ which indicated that this solution contains no substantial impurities. 500 ml. of this resulting eluate solution contained 46.2 mg. of FAD. The eluate was treated in an analogous manner to that described in Example 1 to yield 40.2 mg. of FAD having a purity of 89.2%.

Example 3

The pH of a crude aqueous FAD-containing solution from a fermentation broth similar to that described in Example 2 was adjusted to 2.5. 250 ml. of this solution were passed through a cation exchange resin column packed with 300 ml. of "Dowex" 30 (the trade name of a phenolic cation exchange resin available from Dow Chemical Co., U.S.A.) in the free base form so as to absorb the FAD from the crude solution. The absorbed FAD was then eluted with a mixture containing 50% by weight acetone and 50% by weight water to yield an eluate containing 29.3 mg. of FAD. After removal of the acetone, the absorbance ratio of the eluate was 4.12 at 450 m$\mu$ and 260 m$\mu$ indicating no substantial impurities present in the eluate. The eluate was then treated in an analogous manner to that described in Example 1 to yield 20.1 mg. of FAD having a purity of 81.2%.

Example 4

250 ml. of crude aqueous solution obtained from a cell extract which contained 20.1 mg. of FAD was passed through a resin bed containing a 50 ml. of "Duolite" C-10 (the trade name of a phenolic cation exchange resin available from Chemical Process Co., U.S.A.) to absorb the FAD from the crude solution. The resin bed was then washed with 0.02 N hydrochloric acid solution containing one mol per litre sodium chloride. After washing, the resin bed was then eluted by passing 0.01 M $KH_2PO_4$–$Na_2HPO_4$ aqueous buffer solution having a pH of 7.0 through the bed thereby yielding 150 ml. of an eluate containing 19.3 mg. of FAD. The absorbance ratio of the eluate was 4.02 at 450 m$\mu$ and 260 m$\mu$ which indicated that no substantial impurities were present in the eluate. After desalting, concentrating, crystallizing, etc., 11.3 mg. of FAD having a purity of 78.2% were obtained.

Example 5

In a similar manner to that described in Example 4, 20.1 mg. of FAD were absorbed by 50 ml. of "Duolite" C-10 (the trade name of a phenolic cation exchange resin available from Chemical Process Co., U.S.A.). The exchange resin was eluted with an aqueous solution of ammonia having an adjusted pH of 8.5. 180 ml. of the eluate contained 18.4 mg. of FAD. The absorbance ratio of the eluate was 3.99 at 450 m$\mu$ and 260 m$\mu$ which indicated that no substantial impurities were present in the eluate. The eluate was concentrated at a temperature of no higher than 40° C. under reduced pressure and at a pH of not more than 10; the concentrated eluate was then treated in an analogous manner to that described in Example 1 to yield 11.0 mg. of FAD having a purity of 80.2%.

While specific embodiments of the invention have been described in detatil to illustrate the application of the principles of the invention, it will be understood that the invention may be embodied otherwise without departing from such principles.

What we claim is:

1. A process for recovering flavin adenine dinucleotide from crude aqueous solutions containing in addition to flavin adenine dinucleotide various other organic impurities comprising:
    (a) adjusting the pH of said crude solution to a pH of from about 1.0 to 3.0;
    (b) passing said crude solution while it is maintained at a pH of from about 1.0 to 3.0 into contact with a phenolic cation exchange resin to absorb the flavin adenine dinucleotide onto the resin and remove it from the crude solution and
    (c) passing an aqueous medium having a pH of from about 3 to about 10 through said resin containing said flavin adenine dinucleotide absorbed thereon to elute said flavin adenine dinucleotide from said resin and into said aqueous medium.

2. The process of claim 1 which comprises the additional step of separating said flavin adenine dinucleotide from said aqueous medium after said flavin adenine dinucleotide is eluted from said resin.

3. A process as claimed in claim 1 wherein said flavin adenine dinucleotide is absorbed by said resin by passing said crude solution through a column of the phenolic cation exchange resin.

4. A process as claimed in claim 1 wherein said crude solution is adjusted to a pH of from about 1.0 to about 2.5.

5. A process as claimed in claim 1 wherein said crude aqueous solution contains an inorganic salt dissolved therein prior to contact with the phenolic cation exchange resin.

6. A process as claimed in claim 5 wherein said inorganic salt is selected from the group consisting of sodium chloride, ammonium chloride and mixtures thereof.

7. A process as claimed in claim 1 wherein said phenolic cation exchange resin contains an active radical selected from the group consisting of sulphonic acid, methyl sulphonic acid, methylene sulphonic acid radicals and salts, thereof.

8. A process as claimed in claim 1 wherein the cation exchange resin with said flavin adenine dinucleotide absorbed thereon is washed with an acidic aqueous solution having a pH less than about 3.0 before said aqueous medium is passed therethrough.

9. A process as claimed in claim 8 wherein said acidic aqueous solution contains a material selected from the group consisting of sodium chloride, ammonium chloride, hydrochloric acid and mixtures thereof.

10. A process as claimed in claim 8 wherein the cation exchange resin is washed with the said acidic aqueous solution until the washings are substantially colorless and show no significant U.V. absorption.

11. A process as claimed in claim 1 wherein said aqueous medium is pure water.

12. A process as claimed in claim 1 wherein said aqueous medium contains a material selected from the group consisting of acids, bases and water-miscible organic solvents and mixtures thereof.

13. A process as claimed in claim 12 wherein the aqueous solution is a buffer solution.

14. A process as claimed in claim 12 wherein the aqueous solution contains hydrochloric acid.

15. A process as claimed in claim 12 wherein said solution contains a water miscible solvent selected from the group consisting of methanol, ethanol, acetone, pyridine and mixtures thereof.

References Cited

UNITED STATES PATENTS

| | | | |
|---|---|---|---|
| 3,271,386 | 9/1966 | Huang | 260—211.5 |
| 3,120,511 | 2/1964 | Tanaka et al. | 260—211.5 |

LEWIS GOTTS, Primary Examiner

JOHNNIE R. BROWN, Assistant Examiner

U.S. Cl. X.R.

260—999